United States Patent

Straub

Patent Number: 5,813,600
Date of Patent: Sep. 29, 1998

[54] METHOD FOR OPERATING A HEATING AND/OR AIR CONDITIONING SYSTEM

[75] Inventor: Wolfgang Straub, Deggingen, Germany

[73] Assignee: Mercedes-Benz AG, Stuttgart, Germany

[21] Appl. No.: 840,916

[22] Filed: Apr. 18, 1997

[30] Foreign Application Priority Data

Apr. 18, 1996 [DE] Germany ............... 196 15 239.9

[51] Int. Cl.⁶ .................................................. F24F 11/04
[52] U.S. Cl. .................... 236/49.3; 165/204; 236/DIG. 9
[58] Field of Search ............................... 236/49.3, 49.1,
236/91 R, 91 C, 91 D, 91 E, 91 F, DIG. 9;
62/186, 244, 203, 407, 408; 165/204, 202,
203, 217; 454/75

[56] References Cited

U.S. PATENT DOCUMENTS

| | | | |
|---|---|---|---|
| 4,748,822 | 6/1988 | Erbs et al. ........................ | 165/217 X |
| 5,137,213 | 8/1992 | Yamamoto et al. ............... | 165/204 X |
| 5,390,728 | 2/1995 | Ban ................................... | 62/186 X |
| 5,653,385 | 8/1997 | Honda et al. ..................... | 236/49.3 |

FOREIGN PATENT DOCUMENTS 41 13 374 10/1991 Germany.
41 00 817 7/1992 Germany.
43 41 208 6/1995 Germany.

Primary Examiner—Harry B. Tanner
Attorney, Agent, or Firm—Evenson, McKeown, Edwards & Lenahan P.L.L.C.

[57] ABSTRACT

A method for operating a heating or air conditioning system, especially for motor vehicles is provided, in which a temperature control fluid is drawn in via a discharge blower whose discharge power can be regulated, and is blown out after processing through at least one exhaust duct, whose outlet cross section can be regulated via a corresponding controllable control element. Each control element for outlet cross section regulation is automatically adjusted to assume a position that depends upon the outlet temperature of the temperature control fluid. The discharge blower power is adjusted according to a curve as a function of this outlet temperature. This curve is determined as a function of the positions of the control elements that regulate the outlet cross section and the total outlet cross section of the system thus determined in such fashion that an essentially constant temperature control fluid outflow rate is achieved regardless of the outlet temperature of the temperature control fluid and hence independently of the different positions of the control elements that regulate the outlet cross section.

4 Claims, 2 Drawing Sheets

METHOD FOR OPERATING A HEATING AND/OR AIR CONDITIONING SYSTEM

BACKGROUND AND SUMMARY OF THE INVENTION

This application claims the priority of German Application No. 196 15 239.9, the disclosure of which is expressly incorporated by reference herein.

The invention relates to a method for operating a heating and/or air conditioning system especially for a motor vehicle in which a temperature control fluid is drawn in by means of a discharge blower whose discharge power can be regulated. The fluid is blown out again after being processed through at least one outlet duct. The outlet cross section of the at least one outlet duct can be regulated by means of a corresponding controllable control element.

Such known methods are employed for example to operate heating and/or air conditioning systems incorporated in motor vehicles. The air serves as the temperature control fluid and the dampers serve as control elements to regulate the outlet cross sections of the air outlet duct or ducts. The adjustment of the dampers changes the mass air flow blown into the vehicle interior and hence the heating or air conditioning power for the vehicle interior in a desired fashion.

A method of this kind for air conditioning a vehicle interior is known from German Patent document DE 43 41 208 A1, in which the actual temperature used to regulate the interior temperature is measured in the outlet area of the air flow from the vehicle interior, and the intake temperature of the air flow into the vehicle interior is also detected and the mass air flow is regulated when the difference between the interior temperature and the temperature setting exceeds a predetermined value, in such fashion that the mathematical product of a distinctive number for the mass air flow and the value of the difference between the inlet temperature and the actual temperature is maximal.

German Patent document DE 41 13 374 A1 describes a regulating device for an air conditioner with a fan for blowing air at a regulated temperature into a space. A sensor device is provided for measuring the skin temperature of the persons located in the space. The regulating device is provided with a regulating unit that determines the strength of the air stream blown in as a function of the skin temperature measured by the sensor device, as well as a desired skin temperature, in order to achieve a perceived optimum desired temperature for the persons. The electronic regulating unit is designed to activate the fan that blows the air stream with the prescribed force determined in this fashion.

With an air volume regulating system for motor vehicles disclosed in German Patent document DE 41 00 817 A1, the air volume supplied to the vehicle interior can be regulated as a function of a predetermined desired value, taking into account interfering factors such as vehicle speed, operation of the windows and sunroof, and the like. For this purpose, a device is provided for measuring the pressure differential between the intake pressure that prevails in an air guide duct downstream from a discharge blower and the pressure prevailing in the vehicle interior. The voltage applied to the blower motor depends upon a comparison made in a corresponding regulating unit between the measured pressure differential that is a measure of the air volume delivered, and an adjustable predetermined desired air volume. This patent document also mentions a regulating system in which a signal proportional to the road speed is tapped-off the tachometer and used to regulate the setting of an intake damper in the air guide duct in order to adjust the volume of air supplied to the vehicle interior as a function of the vehicle's speed.

In general it may be said that fully automatic air conditioning systems for motor vehicles are known in which the blower power is regulated automatically as a function of the deviation of the interior temperature from the system setting, the hot water flow temperature or cooling water temperature, the heating or cooling mode, the vehicle speed signal, the filter or circulation operation, solar irradiation, a permanently programmed blower rpm basic load level and/or of individual damper positions, for example increasing the blower rpm by a fixed value when the floor vent dampers are open, lowering the rpm when the skimming dampers are open, etc.

As is known, the discharge velocity of the air emerging from the corresponding nozzles of the heating and/or air conditioning system of a motor vehicle into its interior primarily depends on the blower rpm or blower power, the intake cross-sectional area of the blower system, which remains constant, and the changing total outlet cross section of the entire heating and/or air conditioning system. When the interior temperature has reached the desired setting, and all the other parameters that influence the blower are approximately constant, the blower runs at a certain power level at a basic load level. As a result of the fully automatic adaptation of the damper positions as a function of the temperature of she air being blown out, as a rule, for design considerations, the total outlet cross section of the heating or air conditioning system and hence the air speed at the outlet nozzles changes. This change in air speed is perceived as irritating by the passenger since he is usually struck by the air flow directly in the head, neck, or chest area. Such an irritating change in air speed caused by the ventilation temperature being set higher, and hence a change in the damper position, can be triggered for example when the vehicle enters a tunnel or a thunderstorm. If the blower power is not adapted to the damper positions, the vehicle occupants may feel drafts.

To remedy this situation, an air conditioner for motor vehicles has already been proposed in which the positions of the fully automatically adjustable dampers such as the skimming dampers, foot dampers, defroster dampers, and temperature control dampers are detected individually and entered into an algorithm for calculating blower voltage. The adaptation of this procedure to real-world vehicle situations however is comparatively expensive since it is difficult to test all possible conditions, and many other parameters are involved. Moreover, a relatively high programming cost is involved.

There is therefore needed a method of the above-mentioned type with which comfortable temperature control is guaranteed in a comparatively simple fashion. Any changes in air speed should be counteracted by automatic changes in the effective outlet cross section.

These needs are met according to the present invention by a method for operating a heating and/or air conditioning system especially for a motor vehicle in which a temperature control fluid is drawn in by means of a discharge blower whose discharge power can be regulated. The fluid is blown out again after being processed through at least one outlet duct. The outlet cross section of the at least one outlet duct can be regulated by means of a corresponding controllable control element. Each control element is automatically adjusted to regulate the outlet cross section so as to assume a position ($\alpha_T$, $\alpha_E$, $\alpha_F$) that depends on the temperature ($T_L$)

of the temperature control fluid flowing out. The discharge power of the discharge blower is adjusted by means of a curve ($U_G$) as a function of the temperature control fluid outlet temperature ($T_L$). This curve ($U_G$) is dependent on positions ($\alpha_T$, $\alpha_E$, $\alpha_F$) of the control elements involved and on the total outlet cross section ($A_L$) thus determined in such fashion that the temperature control fluid outflow rate remains essentially constant.

In this method, each control element that serves to regulate the outlet cross section is controlled to move into a position that is chosen as a function of the temperature of the temperature control fluid that is blown out, for which purpose a corresponding curve is advantageously provided. Positions of the control elements that reflect the curves of the settings that depend on the temperature control fluid/air exhaust temperature and the resultant total outlet cross section are used to plot a curve as a function of the temperature of the exhaust temperature control fluid according to which the discharge power of the discharge blower is regulated. The discharge power is adjusted so that the outlet rate of the temperature control fluid remains essentially constant regardless of the outlet temperature.

By using this procedure, with relatively little programming cost and limited memory requirements in the regulating electronics as well as only a low application cost, a high level of temperature-control comfort is achieved when operating a heating and/or air conditioning system in a motor vehicle for example. The automatic adjustment of the total outlet cross section that takes place to change the temperature control power is accompanied by a corresponding change in the discharge power of the discharge blower chosen, so that significant fluctuations in the temperature control fluid outflow rate are avoided. Structural changes in the system, in a cross-section outlet duct and/or a corresponding control element for regulating the outlet cross section for example, can be taken into account comparatively simply and rapidly by suitably adapting the curves. System operation can be adapted to a shift in a curve for an outlet cross section-regulating control element with equal simplicity, when used in a vehicle for example when a footwell damper is caused to open at a higher temperature than before.

An improved method according to the present invention is especially adapted to situations that prevail in heating and/or air conditioning systems built into motor vehicles and includes an intake blower and exhaust blower as well as various dampers as control elements to regulate the outlet cross section.

Other objects, advantages and novel features of the present invention will become apparent from the following detailed description of the invention when considered in conjunction with the accompanying drawings.

DETAILED DESCRIPTION OF THE DRAWINGS

FIG. 1 shows, in the form of diagrams (a)–(e), the curves of various dampers of an air conditioning system of a motor vehicle as well as a curve showing their total outlet cross-section and the basic load voltage of an intake blower, each as a function of air outlet temperature.

Figure 1A:
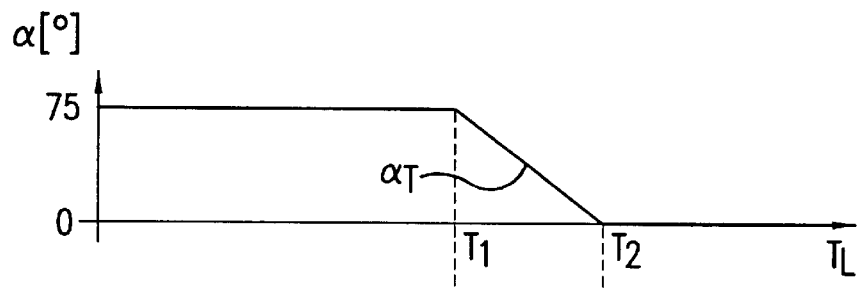
FIGS. 1(a)–1(e) are diagrams of curves of various dampers of an air conditioning system as well as a curve of their total outlet cross-section and basic intake blower load voltage, as a function of air outlet temperature.
Figure 1B:
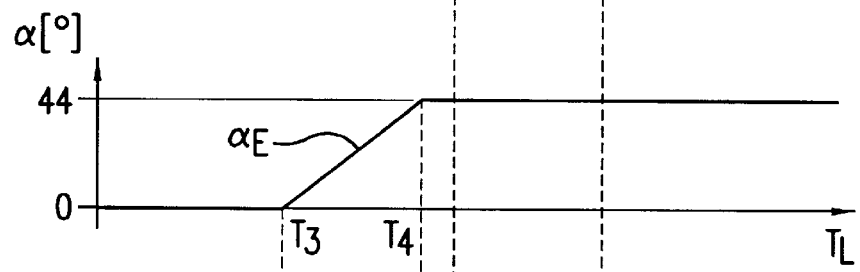
Figure 1C:
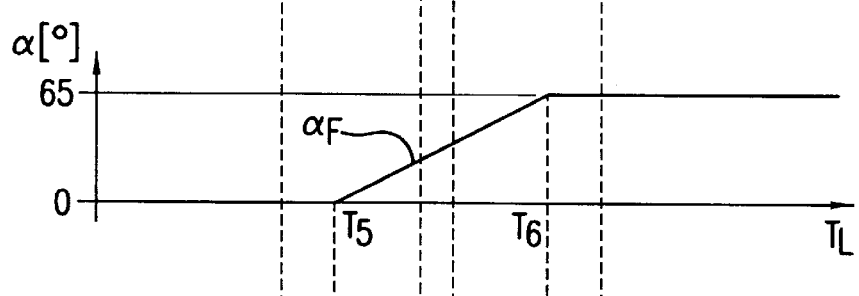
Figure 1D:
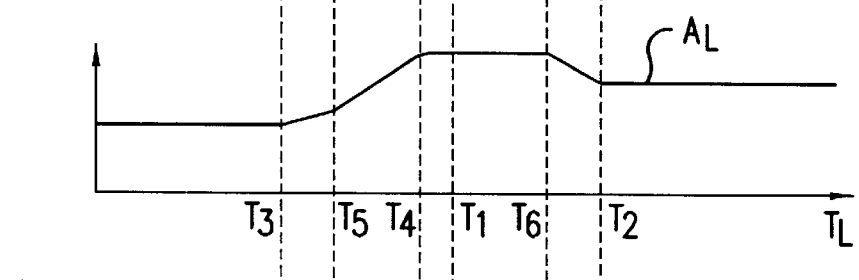
Figure 1E:
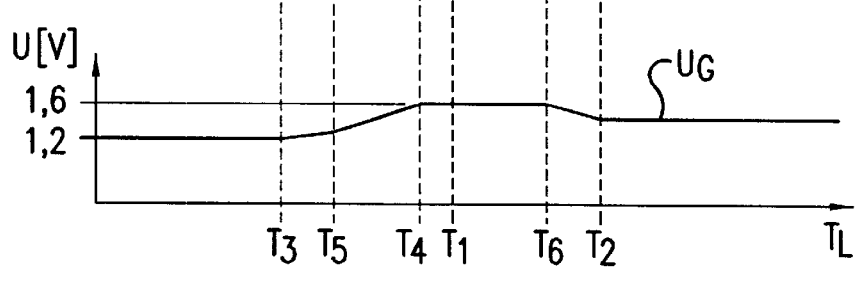
Figure 2:
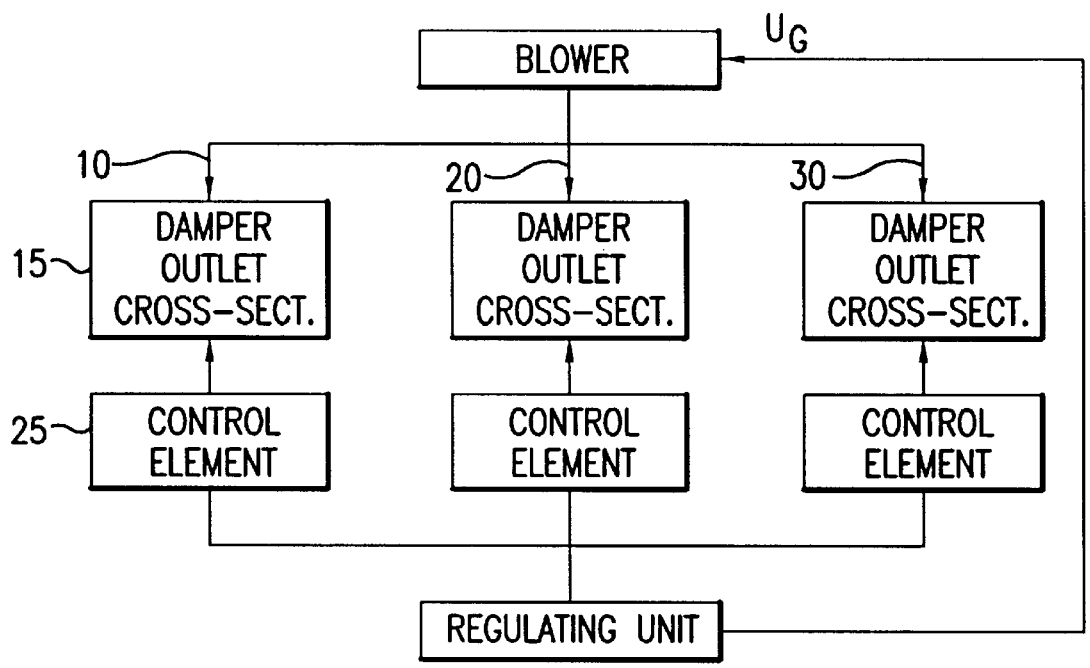
FIG. 2 is a schematic block diagram illustrating the control elements which adjust the outlet cross-sections of the ducts according to the present invention.

The method described below, when employed in conjunction with the curves shown in FIG. 1, serves to operate an air conditioning system of a motor vehicle that has three outlet ducts, namely a temperature control duct 10, a defroster duct 20, and a footwell duct 30 (see FIG. 2). Each of the ducts contains a pivotably movable damper 15 to regulate the outlet cross section. It is understood that depending on the system design, each air outlet duct can consist of many parts composed of several partial ducts that run to various parts of the vehicle interior, with each containing a damper of its own. In this sense, therefore, the term "temperature control damper" will be understood to mean the totality of all the control elements 25 that act on the total effective outlet cross section of the multichannel temperature control duct in question; the same is true of the terms "defroster damper" and "footwell damper."

According to the method, curves are provided showing the damper angle ($\alpha$) of the pivotably movable dampers as a function of the temperature of the air flowing out of the air conditioning system, blown into the vehicle interior, and serving as a temperature control fluid for the temperature control damper, the defroster damper, and the footwell damper. Thus, the damper angle ($\alpha_T$) for the temperature control damper, as shown in the graph at the top (FIG. 1(a)), decreases linearly with increasing air outlet temperature, starting at a preset first temperature value ($T_1$), until it reaches zero at a second temperature value ($T_2$) Conversely, damper angle ($\alpha_E$) of the defroster damper, as shown in the second graph from the top (FIG. 1(b)), rises linearly with increasing air outlet temperature ($T_L$), starting at a third temperature value ($T_3$) until it reaches a maximum value of 44°, which it reaches at a fourth temperature value ($T_4$) that is smaller than the first temperature value ($T_1$). Similarly, the damper angle ($\alpha_F$) of the footwell damper (FIG. 1(c)) rises linearly from zero to a maximum value of 65° with increasing air outlet temperature ($T_L$) beginning at a fifth temperature value ($T_5$) between the third ($T_3$) and fourth ($T_4$) values, said maximum value being reached at a sixth temperature value ($T_6$) located between the first ($T_1$) and the second ($T_2$) temperature values.

A certain effective outlet cross section of the corresponding air outlet duct corresponds to each damper angle ($\alpha_T$, $\alpha_E$, $\alpha_F$) and hence to each position of the pivotably movable dampers. The control or regulating unit of the system determines the resultant total outlet cross section ($A_L$) of all the air outlet ducts in the system from the damper angle curves set as a function of the air outlet temperature ($\alpha_T$, $\alpha_E$, $\alpha_F$) for each air outlet temperature value. The resultant curve of the total outlet cross section ($A_L$) as a function of the air outlet temperature ($T_L$) is shown qualitatively in the second graph from the bottom in FIG. 1(d). This shows that the total outlet cross section ($A_L$) rises linearly with increasing air outlet temperature ($T_L$) from a value determined by the temperature control damper that is open at low air outlet temperatures, starting with the third temperature value ($T_3$) and extending in sections up to the sixth temperature value ($T_6$), namely between the fifth ($T_5$) and fourth ($T_4$) temperature values with a greater steepness than between the third ($T_3$) and fifth ($T_5$) or between the fourth ($T_4$) and first temperature values ($T_1$). Between the first ($T_2$) and sixth ($T_6$) temperature values there is only a very small rise since in this area the increasing opening of the footwell damper is approximately compensated by the closure of the temperature control damper. Since the closing of the temperature control valve continues after the maximum aperture angle of the floor area damper has been reached, as the air outlet temperature ($T_L$) increases, the total outlet cross section ($A_L$) again drops off slightly to a second temperature value ($T_2$)

Using as a basis the curve thus determined for the total outlet cross section ($A_L$) as a function of the air outlet temperature ($T_L$), according to the method the basic load voltage ($U_G$) of a discharge blower of the air conditioning system in the form of an intake blower is suitably automatically regulated so that the air outlet speed remains approximately constant independently of any total outlet cross section ($A_L$) that may apply. For this purpose, to adjust this lower voltage ($U_G$) for basic load operation of the blower, a curve is used that is shown in the bottom diagram in the figure and whose path is proportional to that of the total outlet cross section curve ($A_L$). The blower basic load voltage ($U_G$) varies between 1.2 V and 1.6 V. A change in the total outlet cross section ($A_L$) caused by an automatic damper adjustment thus results in a proportional change in the basic load discharge power of the intake blower. This occurs in such fashion that the air that has been processed by the air conditioning system and conducted into the interior of the vehicle flows out at an essentially constant speed from the air outlet ducts through corresponding nozzles during basic load operation of the system, in other words, when no other blower power changes have taken place as a result of the interior temperature deviating from a setting or the like.

Of course, depending on the system, different blower voltage curves $U_G$ can be obtained for operation of a heating and/or air conditioning system according to the method in order to ensure in any event that automatic changes in the effective outlet cross section of the system, caused for example by damper adjustments, will not result in a significantly different air outlet speed at the respective outlet nozzles. The curve ($U_G$) that serves to adjust the basic load discharge power of the blower as a function of the air outlet temperature ($T_L$) can be determined as an alternative to the determination described above using the curve of the total outlet cross section ($A_L$), by using a series of measurements in which the blower voltage is changed for each air outlet temperature value or a totality of adjusted damper angles until a constant value is set for the air outflow speed. Of course, the method according to the measure for keeping the air outlet speed constant as desired can also be limited to a portion of all the air outlet ducts or dampers of the heating and/or air conditioning system, for example when used in motor vehicles, or to the outlet ducts that are especially relevant for the vehicle occupants feeling a draft, such as the outlet ducts associated with the lateral ventilation nozzles.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for operating at least one of a heating and air conditioning system of a motor vehicle in which a temperature control fluid is drawn in via a discharge blower having a regulatable discharge power, and is blown out again after being processed through at least one outlet duct having an outlet cross-section which is regulatable via a corresponding controllable control element, the method comprising the steps of:

automatically adjusting each control element to regulate an outlet cross-section so as to assume a position depending on a temperature of the temperature control fluid being blown out; and adjusting the regulatable discharge power of the discharge blower via a characteristic curve ($U_G$) as a function of the temperature ($T_L$) of the temperature control fluid, said characteristic curve being dependent on the positions of each control element and on a total outlet cross-section ($A_L$) determined based on each control element such that a temperature control fluid outflow rate remains substantially constant.

2. The method according to claim 1 in which a temperature control damper, a defroster damper, and a footwell damper having associated control elements are provided, the method further comprising the step of using said characteristic curve for a basic load operation of said discharge blower.

3. A method for operating at least one of a heating and air conditioning system, the method comprising the steps of:

automatically adjusting positions of control elements having associated outlet cross-sections such that said positions correlate with a temperature of a temperature control fluid flowing out of said outlet cross-sections;

adjusting a discharge power of a discharge blower via a characteristic curve as a function of the temperature of the temperature control fluid, said characteristic curve being a function of said positions of said control elements and a total outlet cross-section of said outlet cross-sections such that a temperature control fluid outflow rate remains essentially constant.

4. A temperature control system, comprising:

a discharge blower having a regulatable discharge power;

outlet ducts coupled to said discharge blower through which a temperature control fluid is blown, said outlet ducts having respective outlet cross-sections;

automatically adjustable control elements coupled to said outlet ducts in order to regulate the outlet cross-sections in accordance with positions depending on a temperature of the temperature control fluid;

a regulating unit coupled to said discharge blower in order to control said discharge power via a characteristic curve as a function of the temperature, said regulating unit being programmed to determine said characteristic curve in accordance with said positions of said control elements and a total outlet cross-section of said outlet cross-sections such that temperature control fluid outflow rate remains constant.

* * * * *